US006734254B1

(12) United States Patent
Worm et al.

(10) Patent No.: US 6,734,254 B1
(45) Date of Patent: May 11, 2004

(54) CO-CURABLE BLENDS FEATURING BROMINE-AND IODINE-CONTAINING FLUOROPLASTIC POLYMERS

(75) Inventors: Allan T. Worm, North St. Paul, MN (US); William D. Coggio, Hudson, WI (US); Ralph Kaulbach, Emmerting (DE); Friedrich Kloos, Mainz (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/340,969

(22) Filed: Jan. 13, 2003

(51) Int. Cl.$^7$ .................. C08L 27/10; C08L 27/12; C08L 43/00
(52) U.S. Cl. .................. 525/199; 525/200; 525/209
(58) Field of Search .................. 525/199, 200, 525/209

(56) References Cited

U.S. PATENT DOCUMENTS

| 3,937,690 | A | | 2/1976 | Weisgerber et al. |
| 3,987,126 | A | * | 10/1976 | Brodoway .................. 525/200 |
| 4,000,356 | A | | 12/1976 | Weisgerber et al. |
| 4,035,565 | A | | 7/1977 | Apotheker et al. |
| 4,148,982 | A | | 4/1979 | Morozumi et al. |
| 4,214,060 | A | | 7/1980 | Apotheker et al. |
| 4,243,770 | A | | 1/1981 | Tatemoto et al. |
| 4,277,586 | A | | 7/1981 | Ukihashi et al. |
| 4,745,165 | A | | 5/1988 | Arcella et al. |
| 5,037,921 | A | | 8/1991 | Carlson |
| 5,173,553 | A | | 12/1992 | Albano et al. |
| 5,285,002 | A | | 2/1994 | Grootaert |
| 5,354,824 | A | | 10/1994 | Arcella et al. |
| 5,378,782 | A | | 1/1995 | Grootaert |
| 5,585,449 | A | | 12/1996 | Arcella et al. |
| 6,160,053 | A | * | 12/2000 | Enokida et al. .............. 525/199 |
| 6,203,873 | B1 | | 3/2001 | Shifman et al. |
| 6,310,141 | B1 | | 10/2001 | Chen et al. |
| 6,310,142 | B1 | | 10/2001 | Apostolo et al. |
| 6,365,250 | B2 | | 4/2002 | Shifman et al. |
| 6,395,834 | B1 | | 5/2002 | Albano et al. |

FOREIGN PATENT DOCUMENTS

| EP | 0 661 304 A1 | 7/1995 |
| EP | 0 769 521 A1 | 4/1997 |
| EP | 0 784 064 A1 | 7/1997 |
| WO | WO 99/48939 | 9/1999 |

OTHER PUBLICATIONS

"New Fluoroelastomers For High Demanding Applications", by G. Sanvito, G. Comino, S. Arrigoni, A. Staccione, M. Apostolo, M. Albano, Ausimont S.p.A., pp. 324–331, Presented at ACS Conference Oct. 13–16, 2002, Savannah, Georgia, "Fluoropolymer 2002", paper #12.

* cited by examiner

Primary Examiner—Nathan M. Nutter
(74) Attorney, Agent, or Firm—Dean M. Harts

(57) ABSTRACT

Provided is a co-curable blend comprising (a) a fluoroplastic comprising (i) bromine atoms, iodine atoms, and combinations thereof, and (ii) units derived from a fluorinated monomer, and a peroxide curable fluoroelastomer gum. The invention also provides a composition comprising a fluoroplastic comprising (i) bromine atoms, iodine atoms, and combinations thereof and (ii) units derived from a fluorinated monomer, peroxide curable fluoroelastomer gum, a peroxide curative, and optionally a coagent. The fluoroplastic has an MFI no greater than 5 g/10 min., and/or an average particle size greater than 100 nm. The invention also provides a method of making a fluoropolymer blend and cured articles.

21 Claims, No Drawings

CO-CURABLE BLENDS FEATURING BROMINE-AND IODINE-CONTAINING FLUOROPLASTIC POLYMERS

TECHNICAL FIELD

This invention relates to fluoropolymers.

BACKGROUND

Fluoropolymers are a commercially useful class of materials. Fluoropolymers include, for example, crosslinked fluoroelastomers, uncrosslinked fluoroelastomer gums, and semi-crystalline plastics. Fluoropolymers exhibit significant tolerance to high temperatures and harsh chemical environments. They are particularly useful as seals, gaskets, and other molded parts in systems that are exposed to elevated temperatures and/or harsh chemicals. Such parts are widely used in the automotive, chemical processing, semiconductor, aerospace, and petroleum industries, among others.

SUMMARY

In general, the invention features co-curable blend compositions that include a peroxide-curable fluoroelastomer gum in combination with a fluoroplastic. The fluoroplastic includes (a) at least one bromine atom, iodine atom, or combination thereof, and (b) units derived from at least one fluorinated monomer. The presence of the bromine and/or iodine atoms enables the fluoroplastic to co-cure with the fluoroelastomer gum, resulting in cured articles having improved physical properties such as tensile strength, tear strength, low temperature retraction, and the like. In one embodiment, the fluoroplastics have a melt flow index (MFI) no greater than five grams per ten minutes (measured at 372° C. and 5 kg). A high molecular weight (low MFI) fluoroplastic phase of the blend reduces the flow of the plastic phase while under stress at elevated temperatures. In another embodiment, the fluoroplastics have an average particle size in the latex greater than 100 nm. In another embodiment, the invention provides a method of making a fluoropolymer blend comprising providing a fluoroplastic comprising (i) bromine atoms, iodine atoms, and combinations thereof, and (ii) units derived from a fluorinated monomer, said fluoroplastic having a melt flow index no greater than 5 (measured at 372° C. and 5 kg) and/or having an average particle size greater than 100 nm, providing a peroxide curable fluoroelastomer gum, and blending the fluoroplastic and the fluoroelastomer gum. Uses for the blends and articles include o-rings, gaskets, tubing, and seals in applications related to, for example, the automotive and aerospace industries.

The details of one or more embodiments of the invention are set forth in the description below. Other features, objects, and advantages of the invention will be apparent from the description and from the claims.

DETAILED DESCRIPTION

The fluoroplastics include bromine atoms, iodine atoms, and combinations thereof, and units derived from at least one fluorinated monomer. In addition, the fluoroplastics have a melt flow index no greater than 5 and/or a particle size in the latex greater than 100 nm. The bromine and iodine atoms enable the fluoroplastic to participate in a cure reaction when combined with a fluoroelastomer gum. The fluoroplastic can be formed of slightly modified tetrafluoroethylene polymer (below about 5 mole percent (mol %) comonomer) or of tetrafluoroethylene copolymers with one or more monomers (at least about 5 mol % comonomer) containing at least one ethylene unsaturation in amounts varying from about 0.001 mol % to about 15 mol %, preferably about 0.01–10 mol %. The fluoroplastic melting points range from about 150–325° C., more preferably from about 200–325° C., and most preferably from about 230–315° C. This high melting point enhances high temperature performance properties of the cured blend.

Examples of suitable monomers for the fluoroplastic include olefins, fluoroolefins, and perfluoroolefins (e.g., tetrafluoroethylene, hexafluoropropylene, vinylidene fluoride, and ethylene) and perfluorovinyl ethers of the formula $CF_2=CF(OCF_2CF(CF_3))_m(O(CF_2)_n)_pOR_f$ where m=0–2, n=0–6, p=0–6, and $R_f$ is a $C_1$–$C_6$perfluoroalkyl group. Specific examples include perfluoromethylvinyl ether (PMVE; m=0, n=0, p=0, $R_f=CF_3$), perfluoromethoxypropylvinyl ether (PMPVE; m=0, n=3, p=1, $R_f=CF_3$), perfluoropropylvinyl ether (PPVE-1; m=0, n=0, p=0, $R_f=CF_2CF_2CF_3$), perfluoropropylvinyl ether-2 (PPVE-2; m=1, n=0, p=0, $R_f=CF_2CF_2CF_3$), and combinations thereof. Perfluoroalkoxyvinyl ethers may also be included, alone or in combination with other fluorinated monomers. Preferred monomers include perfluoroolefins and perfluorovinyl ethers.

The bromine and iodine atoms may be incorporated in the fluoroplastic in several ways. In one embodiment, the fluorinated monomer(s) is copolymerized with a bromine- or iodine-containing monomer such as bromotrifluoroethylene (BTFE), bromine- or iodine-containing perfluorovinyl ether, 4-bromoperfluorovinylbutene and 4-bromo-3,3,4,4-tetrafluoro-1-butene. In another embodiment, the fluorinated monomer(s) is polymerized in the presence of a bromine- or iodine-containing chain transfer agent. Useful chain transfer agents include diiodomethane, dibromomethane, dibromoperfluoromethane, 1,4-diiodoperfluorobutane, and 1,4-dibromoperfluorobutane.

An effective amount of cure site monomer is used in the fluoroplastic to achieve the desired results. This amount is increased to increase bonding with the fluoroelastomer and this amount is reduced to minimize fluoroplastic modification. The amount of cure site monomer in the fluoroplastic preferably ranges from at least about 0.001 mol %, more preferably at least about 0.01 mol %. The amount of cure site monomer in the fluoroplastic preferably ranges from below about 5 mol %, more preferably below about 2 mol %.

The fluoroplastics preferably are polymerized by aqueous emulsion polymerization in the presence of non-teleogenic fluorine containing surfactants. The polymer particle size is normally in the range of about 100–500 nm (or even between about 100 and 250 nm) after polymerization.

The bromine and/or iodine can be incorporated into the inventive fluoroplastic by incorporating the chain transfer agent(s) and/or cure site monomer(s) either continuously throughout the polymerization, or as a bulk addition in the pre-charge, or more preferably via a core-shell method. One useful core-shell polymerization method involves an emulsion polymerization in which, initially, at least 80 weight percent (wt %) (preferably at least 90 wt %) of a fluorinated monomer-containing composition is polymerized, after which a bromine and/or iodine source is introduced into the reactor, and copolymerizes with the fluorinated polymer. The net result is a fluoroplastic that may have a core-shell structure in which the core predominantly contains units derived from the fluorinated monomer and the shell contains the bromine and/or iodine-containing cure sites.

The fluoroplastic may be combined with a fluoroelastomer gum and a curative composition to form a curable blend. The amount of fluoroplastic in the blend is typically from about 1–50 wt. %, preferably from about 5–50 wt. %, and more preferably from about 10–30 wt. % based upon the total weight of the blend. Fluoroplastics are differentiated from fluoroelastomers by having a melting point which is clearly evident by differential scanning calorimetry.

The fluoroelastomer gum preferably includes bromine and/or iodine atoms. Examples of suitable fluoroelastomer gums are described in U.S. Pat. No. 3,937,690, U.S. Pat. No. 4,035,565 and U.S. Pat. No. 4,243,770.

Useful curatives include peroxides. Examples of useful peroxides include dialkyl peroxides, with di-tertiary butyl peroxides being particularly preferred. Specific examples include 2,5-dimethyl-2,5-di(tertiarybutylperoxy)-hexyne-3 and 2,5-dimethyl-2,5-di(tertiarybutylperoxy)-hexane. Additional examples of useful peroxides include dicumyl peroxide, dibenzoyl peroxide, tertiarybutyl perbenzoate, and di[1,3-dimethyl-3-(tertiarybutylperoxy)-butyl]carbonate.

One or more crosslinking co-agents may be combined with the peroxide. Examples include triallyl cyanurate; triallyl isocyanurate; tri(methallyl)-isocyanurate; tris(diallylamine)-s-triazine, triallyl phosphite; N,N-diallyl acrylamide; hexaallyl phosphoramide; N,N,N'N'-tetraallyl terephthalamide; N,N,N',N'-tetraallyl malonamide; trivinyl isocyanurate; 2,4,6-trivinyl methyltrisiloxane; and tri(5-norbornene-2-methylene) cyanurate The curable blend can also include fillers to improve the physical properties of both the curable and the cured blend. Examples of suitable fillers include reinforcing agents (e.g., thermal grade carbon blacks or non-black pigments), silica, graphite, clay, talc, diatomaceous earth, barium sulfate, titanium oxide and combinations thereof. Other ingredients that may be added to the composition, alone or in combination with one or more fillers, include, for example, metal oxides, plasticizers, lubricants, retarding agents, processing aids, pigments, and combinations thereof.

Thus, the invention provides a composition comprising a fluoroplastic comprising (i) bromine atoms, iodine atoms, and combinations thereof and (ii) units derived from a fluorinated monomer, said fluoroplastic having an MFI no greater than 5 and/or an average particle size greater than 100 nm, a peroxide curable fluoroelastomer gum, a peroxide curative, optionally a coagent, and optionally one or more fillers or additives.

One preferred method of preparing the co-curable blend of this invention is via co-coagulation of the fluoroelastomer and fluoroplastic lattices in the desired ratios. Latex blending is preferred because it produces a substantially homogeneous blend in which the fluoroelastomer gum and fluoroplastic are intimately and uniformly mixed.

The fluoroelastomer gum and fluoroplastic latices are preferably prepared using aqueous-based emulsion polymerization techniques. Suitable polymerization initiators for this purpose include permanganate initiators, with potassium permanganate being particularly preferred, and persulfate initiators, with ammonium and potassium persulfates being particularly preferred. Sulfinates may also be used as part of the initiating system, as described in U.S. Pat. Nos. 5,285,002 and 5,378,782. The fluoroplastic can be produced by incorporating the reactants homogeneously, or as core-shell materials where at least 75% of the composition is polymerized before adding substantial amounts of the bromine/iodine-containing comonomer or chain transfer agent.

The latices may also be coagulated by known methods, including methods involving the addition of salts such as magnesium chloride, aluminum sulfate, and the like, and salt-free methods such as ultrasonic and freeze coagulation.

Before curing, the coagulated, washed and dried curable blend is combined with a curative, preferably by milling the finely divided solids into the gum stock. However, other conventional rubber mixing devices, such as Banbury mixers, can be used as well. To avoid premature curing or "scorch," the temperature during mixing should not rise above about 120° C.

The molding and curing process typically involves compression molding the compounded blend in a mold e.g., a cavity or a transfer mold, followed by oven curing. Compression molding of the compounded blend (press cure) is typically conducted at a temperature between about 95° C. and about 230° C., preferably between about 150° C. and about. 205° C., for a period of from 5 minutes to about 5 hours, usually from 5 minutes to 30 minutes. A pressure of between about 500 kPa and about 15,000 kPa, preferably between about 4,000 kPa and about 8,000 kPa, is imposed on the compounded mixture in the mold. The molded vulcanizate is then usually post cured (oven cured) at a temperature between about 150° C. and about 260° C., usually at about 232° C., for a period of from about 2 hours to 30 hours or more depending on the cross-sectional thickness of the sample. For thick sections, the temperature during the post cure is usually raised gradually from the lower limit of the range to the desired maximum temperature selected. For thinner cross-sections, e.g., less than 5 mm, the vulcanizate or cured sheet section may be put into the oven at the desired maximum temperature.

The invention will now be described further by way of the following examples.

EXAMPLES

The indicated results were obtained using the following test methods, unless otherwise noted. The test results appear in the table below.

Test Methods

Melt Flow Index (MFI): Melt flowrate is measured with a Göttfert Type 011 melt indexer. Measurements were performed according to DIN 53735 at 5 kg and 372° C.

Particle Size: Average particle size of polymer particles in the latex as polymerized was measured with a Malver zeta sizer 100 HS according to ISO 13321.

Melting Point: ASTM D 4591-01

Weight % PPVE-1: The polypropylvinyl ether (PPVE) content in the polymers described herein was determined by infrared spectroscopy using a Nicolet DX 510 FT-IR spectrometer. PPVE was determined from an infrared band at 993 $cm^{-1}$ and was calculated as 0.95× the ratio of the 993 $cm^{-1}$ absorbance to the 2365 $cm^{-1}$ absorbance.

Weight % BTFE: The samples were analyzed semi-quantitatively by XRF (X-ray fluorescence) using a Rigaku 3370 wavelength dispersive X-ray fluorescence spectrometer, a vacuum atmosphere, and a 20 mm diameter measurement area. Weight percent analysis for bromine was done using a calibration method. Each sample was scanned 3 times and the average calculated. One of the calibration standards was also analyzed as an unknown sample to validate the calibration curve. The weight percent BTFE was then calculated from the weight percent bromine.

Cure rheology: Tests were run on uncured, compounded samples using an Alpha Technologies Moving Die Rheometer (MDR) Model 2000 in accordance with ASTM D 5289-93a at 177° C., no pre-heat, 12 minutes elapsed time, and a 0.5 degree arc. Both the minimum torque ($M_L$) and highest torque attained during a specified period of time when no plateau or maximum torque was obtained ($M_H$) were measured. Also measured were the time for the torque to increase 2 units above $M_L$ ("$t_s2$"), the time for the torque to reach a value equal to $M_L+0.5(M_H-M_L)$ ("t'50"), and the time for the torque to reach $M_L+0.9(M_H-M_L)$ ("t'90").

Press-Cure: Sample sheets measuring 150×150×2.0 mm were prepared for physical property determination by pressing at about 6.9 Mega Pascal (MPa) for 10 minutes at 177° C., unless otherwise noted.

Post-Cure: Press-cured sample sheets were exposed to heat in air for 16 h at 232° C. The samples were returned to ambient temperature before testing.

Physical Properties: Tensile Strength at Break, Elongation at Break, and Modulus at 100% Elongation were determined using ASTM D 412-92 on samples cut from the post-cured sheet with ASTM Die D. Units are reported in MPa.

Hardness: Samples were measured using ASTM D 2240-85 Method A with a Type $A_2$ Shore Durometer. Units are reported in points on the Shore A scale.

Compression Set: O-ring samples were measured using ASTM 395-89 Method B, 70 h at 200° C. and 25% deflection. The O-rings had a cross-sectional thickness of 3.5 mm. Results are reported as a percentage of the original deflection.

Tear Strength: Tear strength was determined using ASTM D 624-00 on samples cut from the post-cured sheet with ASTM Die C. The units are reported in kN/m.

Temperature of Retraction (TR): Retraction at Lower Temperatures (TR-10) was determined using ASTM D 1329-88 (reapproved 1993) with ethanol as the cooling media. Units are reported in degrees centigrade. Determined at 50% of break elongation.

Materials and Preparations

Fluoroelastomer A: A fluoropolymer was prepared, by aqueous emulsion polymerization having interpolymerized units of 63.8 mol % vinylidene fluoride (VDF), 16.0 mol % tetrafluoroethylene (TFE), 19.8 mol % perfluoromethoxypropyl vinylether (PMPVE) and 0.4 mol % BTFE.

Fluoroplastic B: A fluoropolymer was prepared by aqueous emulsion polymerization having interpolymerized units of 98.6 mol % TFE and 1.4 mol % PPVE-1. A 40 L stainless steel reactor equipped with a stirrer at 230 rpm was filled with 29 L deionized water and 150 g of a 30 wt % solution of ammonium perfluoro octanoate (APFO). After degassing the system, the reactor was heated to 63° C. and ethane was introduced to reach 0.11 bar, followed by charging 200 g PPVE-1. TFE was introduced to the reactor until a pressure of 13 bar was reached. 1.2 g of the polymerization initiator ammonium peroxodisulfate (APS), dissolved in 50 g Water, was introduced to initiate the polymerization. The pressure was kept constant by feeding TFE and additional PPVE-1 in a ratio of 1:0.041. The polymerization was continued until a total amount of 7.0 kg TFE was reached. Then the polymerization was stopped by closing the TFE feed, and the reactor was vented and discharged. 36.5 kg of a dispersion with a solids content of 20.1 % was obtained. The polymer had the properties shown in Table 1.

Fluoroplastic C: A fluoropolymer prepared by aqueous emulsion polymerization (see "Preparation of Fluoroplastic B") having interpolymerized units of 98.4 mol % TFE, 1.6 mol % PPVE-1, and 0.001 mol % BTFE. The procedure was identical to that of Fluoroplastic B except that having reached a total amount of 6.3 kg TFE, 5 grams BTFE was charged to the reactor. The polymerization was continued until a total amount of 7.0 kg TFE was reached. Then the polymerization was stopped by closing the TFE feed, and the reactor was vented and discharged. 36.8 kg of a dispersion with a solids content of 20.2 % was obtained. The polymer had the properties shown in Table 1.

Fluoroplastic D: A fluoropolymer was prepared by aqueous emulsion polymerization (see "Preparation of Fluoroplastic B") having interpolymerized units of 98.3 mol % TFE, 1.6 mol % PPVE-1, and 0.06 mol % BTFE. The procedure was identical to that of Fluoroplastic C except that 25 grams BTFE was charged to the reactor. 36.6 kg of a dispersion with a solids content of 20.1% was obtained. The polymer had the properties shown in Table 1.

Fluoroplastic E: A fluoropolymer prepared by aqueous emulsion polymerization (see "Preparation of Fluoroplastic B") having interpolymerized units of 98.4 mol % TFE, 1.5 mol % PPVE-1, and 0.13 mol % BTFE. The procedure was identical to that of Fluoroplastic C except that 50 grams BTFE was charged to the reactor. 36.8 kg of a dispersion with a solids content of 19.9% was obtained. The polymer had the properties shown in Table 1.

Fluoroplastic F: A fluoropolymer prepared by aqueous emulsion polymerization (see "Preparation of Fluoroplastic B") having interpolymerized units of 98.0 mol % TFE, 1.7 mol % PPVE-1, and 0.33 mot % BTFE. The procedure was identical to that of Fluoroplastic C except that 100 grams BTFE was charged to the reactor. 36.8 kg of a dispersion with a solids content of 20.2% were obtained. The polymer had the properties shown in Table 1.

Examples 1–4

The latex of Fluoroelastomer A (30 wt % solids) was blended with Fluoroplastic C (20.2 wt % solids). The blend ratio was 80:20 wt % (A:C) based on solids content. The latex blend was coagulated with $MgCl_2 \cdot 6H_2O$ solution (60 g $MgCl_2$ in 2500 g D.I. water), washed with hot water (70° C.), and dried at 130° C. for 16 hours. 125 grams of the blend was compounded on a two roll mill using standard methods with 3.5 grams TAIC-DLC-A (triallylisocyanurate, 72% by weight, available from Harwick), 2.5 grams Varox DBPH-50 (2,5-dimethyl-2,5-di(t-butylperoxy)-hexane, from R. T. Vanderbilt) and 3 grams UPS-1 (zinc oxide, from Zinc Corp. of America). Cure rheology tests were run on the uncured, compounded sample. A sheet and O-rings of the compounded admixture was press cured, and subsequently post-cured. The post-cured samples were tested for various properties. All test results are included in Table 2. For Examples 2–4 the blend ratios and test methods were identical to Example 1. For Example 2 the latex of Fluoroelastomer A (30 wt % solids) was blended with Fluoroplastic D (20.1 wt % solids). For Example 3 the latex of Fluoroelastomer A (30 wt % solids) was blended with Fluoroplastic E (19.9 wt % solids). For Example 4 the latex of Fluoroelastomer A (30 wt % solids) was blended with Fluoroplastic F (20.2 wt% solids).

Comparative Example 1

The latex of Fluoroelastomer A (30 wt % solids) was blended with Fluoroplastic B (20.1 wt % solids). The blend ratios and methods were identical to Example 1. All test results are included in Table 2.

TABLE 1

Fluoroplastic Properties

| | B | C | D | E | F |
|---|---|---|---|---|---|
| Particle Size (nm) | 128 | 112 | 110 | 112 | 109 |
| Melt Flow Index (g/10 min @ 372° C., 5 kg) | 2.1 | 1.8 | 2.4 | 2.7 | 2.3 |
| Melting Point (° C.) | 304 | 307 | 306 | 308 | 306 |
| Weight % Br by XRF | 0 | 0.007 | 0.050 | 0.100 | 0.256 |
| Weight % BTFE calculated from wt % Br | 0 | 0.014 | 0.100 | 0.200 | 0.512 |
| Weight % PPVE-1 by IR | 3.6 | 4.1 | 4.2 | 3.9 | 4.4 |

TABLE 2

Blend Properties

| | Ex. 1 | Ex. 2 | Ex. 3 | Ex. 4 | CE-1 |
|---|---|---|---|---|---|
| Weight % Br in fluoroplastic | 0.007 | 0.050 | 0.100 | 0.256 | 0.00 |
| Cure Rheology | | | | | |
| $M_L$ (dN-m) | 4.0 | 3.5 | 4.0 | 4.1 | 4.3 |
| $M_H$ (dN-m) | 15.0 | 16.5 | 18.2 | 19.6 | 15.7 |
| $M_H$–$M_L$ (dN-m) | 11.0 | 13.0 | 14.2 | 15.5 | 11.4 |
| $t_s2$ (min) | 0.6 | 0.5 | 0.5 | 0.5 | 0.5 |
| t'50(min) | 0.7 | 0.7 | 0.7 | 0.6 | 0.7 |
| t'90(min) | 1.6 | 1.4 | 1.4 | 1.3 | 1.5 |
| Physical Properties | | | | | |
| Tensile (MPa) | 7.6 | 10.2 | 9.7 | 10.4 | 7.5 |
| Elongation (%) | 210 | 250 | 200 | 175 | 165 |
| 100% modulus (MPa) | 1.7 | 1.9 | 2.8 | 3.3 | 3.0 |
| Hardness (Shore $A_2$) | 60 | 59 | 63 | 61 | 58 |
| Tear Strength | | | | | |
| Die C, kN/m | 10.5 | 12.4 | 13.7 | 12.4 | 10.5 |
| Compression Set, Method B, O-Rings | | | | | |
| 70 h 200° C. | 17.8 | 24.4 | 21.0 | 26.3 | 21.9 |
| Temperature of Retraction (° C.) | | | | | |
| TR-2 | −44 | −45 | −48 | −47 | −43 |
| TR-10 | −37 | −37 | −38 | −38 | −36 |
| TR-30 | −32 | −31 | −33 | −33 | −30 |
| TR-50 | −24 | −23 | −28 | −27 | −19 |
| TR-70 | −10 | −12 | −16 | −18 | −6 |

The results show improvements were made in one or properties including crosslink density ($M_H$–$M_L$), tensile, elongation, tear strength, and low temperature of retraction when comparing the control blend example to the other examples.

A number of embodiments of the invention have been described. Nevertheless, it will be understood that various modifications may be made without departing from the spirit and scope of the invention. Accordingly, other embodiments are within the scope of the following claims.

All patent numbers mentioned within the specification are herein incorporated by reference.

What is claimed is:

1. A co-curable blend comprising: (a) a fluoroplastic comprising (i) bromine atoms, iodine atoms, or combinations thereof and (ii) units derived from a fluorinated monomer, said fluoroplastic having a melt flow index no greater than 5 (measured at 372° C. and 5 kg); and (b) a peroxide curable fluoroelastomer gum.

2. The co-curable blend according to claim 1 wherein the bromine atoms, iodine atoms, and combinations thereof are derived from bromine-containing cure site monomers, iodine-containing cure site monomers, and combinations thereof.

3. The co-curable blend according to claim 2 wherein said cure site monomer is selected from the group consisting of bromotrifluoroethylene, iodotrifluoroethylene, and combinations thereof.

4. The co-curable blend according to claim 1 wherein the bromine atoms, iodine atoms, and combinations thereof are derived from bromine-containing chain transfer agents, iodine-containing chain transfer agents, and combinations thereof.

5. The co-curable blend according to claim 4 wherein said chain transfer agents are selected from the group consisting of diiodomethane, dibromomethane, 1,4-diiodoperfluorobutane, 1,4-dibromoperfluorobutane, and combinations thereof.

6. The co-curable blend according to claim 1 wherein said fluorinated monomer is selected from the group consisting of perfluoroolefins, perfluorovinyl ethers, and combinations thereof.

7. The co-curable blend according to claim 6 wherein said perfluoroolefin comprises tetrafluoroethylene.

8. The co-curable blend according to claim 6 wherein said perfluorovinyl ether is selected from the group consisting of perfluoroalkylvinyl ethers, perfluoroalkoxyvinyl ethers, and combinations thereof.

9. The co-curable blend according to claim 1 comprising the reaction product of (a) a bromine-containing cure site monomer, an iodine-containing cure site monomer, or combination thereof, (b) tetrafluoroethylene, and (c) a perfluoroalkylvinyl ether.

10. The co-curable blend according to claim 1 wherein said fluoroplastic is in the form of a core-shell polymer in which the core comprises units derived from the fluorinated monomer and the shell comprises bromine atoms, iodine atoms, or combinations thereof.

11. The co-curable blend according to claim 1 wherein the blend is in the form of a latex.

12. The co-curable blend of claim 1 wherein the fluoroplastic has a melting point >230° C.

13. The co-curable blend of claim 1 wherein the fluoroelastomer comprises bromine atoms, iodine atoms, and combinations thereof.

14. A composition comprising: (a) a fluoroplastic comprising (i) bromine atoms, iodine atoms, and combinations thereof and (ii) units derived from a fluorinated monomer, said fluoroplastic having a melt flow index no greater than 5 (measured at 372° C. and 5 kg) and/or an average particle size greater than 100 nm; (b) a peroxide curable fluoroelastomer gum; (c) a peroxide curative; and optionally (d) a coagent.

15. A cured, shaped article derived from the composition of claim 14.

16. A co-curable blend comprising: (a) a fluoroplastic comprising (i) bromine atoms, iodine atoms, and combinations thereof and (ii) units derived from a fluorinated monomer, said fluoroplastic having an average particle size greater than 100 nm; and (b) a peroxide curable fluoroelastomer gum.

17. The co-curable blend according to claim 16 wherein said fluoroplastic is in the form of a core-shell polymer in which the core comprises units derived from the fluorinated monomer and the shell comprises bromine atoms, iodine atoms, or combinations thereof.

18. The co-curable blend according to claim 16 wherein the blend is in the form of a latex.

19. A method of making a fluoropolymer blend comprising:
(a) providing a fluoroplastic comprising (i) bromine atoms, iodine atoms, and combinations thereof, and (ii) units derived from a fluorinated monomer, said fluoroplastic having a melt flow index no greater than 5 (measured at 372° C. and 5 kg) and/or having an average particle size greater than 100 nm;
(b) providing a peroxide curable fluoroelastomer gum, and
(c) blending the fluoroplastic and the fluoroelastomer gum.

20. The method of claim 19 further comprising blending a peroxide curative with the blend of fluoroplastic and fluoroelastomer.

21. The method of claim 20 further comprising curing the blend.

* * * * *